United States Patent
Holloway et al.

(10) Patent No.: US 7,118,037 B2
(45) Date of Patent: Oct. 10, 2006

(54) RADIO FREQUENCY IDENTIFICATION (RFID) HOUSEHOLD SYSTEM FOR TRACKING AND MANAGING RFID TAG CONTAINING HOUSEHOLD POSSESSIONS WITHIN SHORT RANGE RF LIMITED BOUNDARIES OF A HOUSEHOLD FACILITY

(75) Inventors: Lane Thomas Holloway, Pflugerville, TX (US); Walid M. Kobrosly, Round Rock, TX (US); Nadeem Malik, Austin, TX (US); Marques Benjamin Quiller, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/943,057

(22) Filed: Sep. 16, 2004

(65) Prior Publication Data

US 2006/0054691 A1    Mar. 16, 2006

(51) Int. Cl.
*G06F 17/60* (2006.01)

(52) U.S. Cl. ............... 235/385; 235/487; 235/375; 705/28

(58) Field of Classification Search ............... 235/385, 235/375, 383, 485, 487; 705/28; 340/568.1, 340/572
See application file for complete search history.

(56) References Cited

U.S. PATENT DOCUMENTS

| | | | |
|---|---|---|---|
| 3,970,824 A | 7/1976 | Walton et al. | 235/61.11 H |
| 4,236,068 A | 11/1980 | Walton | 235/380 |
| 4,580,041 A | 4/1986 | Walton | 235/380 |
| 4,688,026 A * | 8/1987 | Scribner et al. | 235/385 |
| 4,918,416 A | 4/1990 | Walton et al. | 235/497 |
| 5,920,261 A * | 7/1999 | Hughes et al. | 340/568.8 |
| 6,353,390 B1 * | 3/2002 | Beri et al. | 340/572.1 |
| 6,600,418 B1 * | 7/2003 | Francis et al. | 340/572.1 |
| 6,742,714 B1 | 6/2004 | Cecil et al. | 235/492 |
| 6,915,135 B1 * | 7/2005 | McKee et al. | 455/456.6 |
| 6,920,330 B1 * | 7/2005 | Caronni et al. | 455/456.1 |
| 2002/0067267 A1 * | 6/2002 | Kirkham | 340/572.7 |
| 2002/0183979 A1 * | 12/2002 | Wildman | 702/188 |
| 2002/0198795 A1 * | 12/2002 | Dorenbosch | 705/28 |
| 2003/0008659 A1 * | 1/2003 | Waters et al. | 455/456 |
| 2003/0018534 A1 * | 1/2003 | Zack et al. | 705/22 |
| 2003/0220835 A1 * | 11/2003 | Barnes | 705/14 |
| 2004/0088231 A1 * | 5/2004 | Davis | 705/28 |

(Continued)

*Primary Examiner*—Thien M. Le
*Assistant Examiner*—Edwyn Labaze
(74) *Attorney, Agent, or Firm*—Julius B. Kraft; Gregory M. Doudnikoff

(57) ABSTRACT

A computer controlled interactive display RFID (radio frequency identification) household system enabling a householder to track and manage a set of RFID tags containing household possessions located within short range RF limited boundaries of a household facility. The implementation includes the combination of a short range RF transceiver for identifying and communicating with all RFID tags within the household boundaries and apparatus for inputting data indicating whether a RFID tag within said household boundaries is in one of the set of household possessions. In such an environment, there also is an implement for inputting this tracking and management data, as well as for storing this input data. There is also provided a function for prompting said householder in response to the entry within said household boundaries of a RFID tag not in one of the set of household possessions. As will be described hereinafter in greater detail, such prompts help the householder to facilitate the tracking of new products that have been purchased without the need of the householder to periodically take time to enter newly acquired household possessions.

18 Claims, 4 Drawing Sheets

U.S. PATENT DOCUMENTS

2004/0220753 A1* 11/2004 Tabe .......................... 702/32
2005/0094610 A1* 5/2005 de Clerq et al. ............ 370/338
2005/0137943 A1* 6/2005 Holzman .................... 705/28
2005/0246094 A1* 11/2005 Moscatiello ................ 701/207
2006/0152338 A1* 7/2006 Hsu ........................... 340/5.5

* cited by examiner

RADIO FREQUENCY IDENTIFICATION (RFID) HOUSEHOLD SYSTEM FOR TRACKING AND MANAGING RFID TAG CONTAINING HOUSEHOLD POSSESSIONS WITHIN SHORT RANGE RF LIMITED BOUNDARIES OF A HOUSEHOLD FACILITY

TECHNICAL FIELD

The present invention relates to short range RF telecommunications and particularly to radio frequency identification (RFID) systems for controlling and tracking of items.

BACKGROUND OF RELATED ART

Radio frequency identification (RFID) of items through the use of RFID tags has been known for more than 50 years. It was first described in the *Proceedings of the IRE*, October 1948, in an article, *Communication by Means of Reflected Power*, Harry Stockman, pp. 1196–1204. RFID tags may be active or passive. The passive tags are minute, in the order of 0.4 mm, and cost a few cents each. These passive RFID tags do not have their own power supply and have a signal range in the order of 5 feet or less. On the other hand, active RFID tags usually have their own power source and currently may have ranges in the order of hundreds of feet and are more expensive. Also, the active RFID tags are commonly referred to as RFID transponders. Usage of RFID tags/transponders has been extensively documented for a wide variety of tracking functions. Low frequency RFID tags are commonly used for animal identification or anti-theft systems in automobiles, for example. Higher frequency RFID tags are used for book tracking, pallet tracking or airline baggage tracking. There are, of course, well developed technologies in the higher frequency RFID tag tracking systems, such as UHF RFID and Microwave RFID tags.

Unlike active RFID tags that require a small power source of some kind, passive tags do not require power. They get their operating power from the energy generated by the tag reader or transceiver. Also, passive tags have an almost unlimited operating life.

The RFID product identification is an old and well developed technology. Some US patents that are representative of the art are: U.S. Pat. Nos. 4,918,416; 4,580,041; 4,236,068; 3,970,824; and 6,742,714. With the rapidly expanding usage of RFID tag systems in both the business and consumer sectors, the prices of the systems and tags have been dropping. This, in turn, has resulted in the industry seeking new uses of this technology. The present invention provides such a new function directed to a particular consumer market, i.e. householders responsible for the routine operation of a household.

SUMMARY OF THE PRESENT INVENTION

The present invention provides a computer controlled interactive display RFID household system enabling a householder to track and manage a set of RFID tags containing household possessions located within short range RF limited boundaries of a household facility. The implementation includes the combination of a short range RF transceiver for identifying and communicating with all RFID tags within the household boundaries and means for inputting data indicating whether a RFID tag within said household boundaries is in one of the set of household possessions. In such an environment, there also are means for inputting this tracking and management data, as well as means for storing this input data. There is also provided means for prompting said householder in response to the entry within said household boundaries of a RFID tag not in one of the set of household possessions. As will be described hereinafter in greater detail, such prompts help the householder to facilitate the tracking of new products that have been purchased without the need of the householder to periodically take time to enter newly acquired household possessions. The householder is enabled in response to such prompts to input said data indicating that the sensed RFID tag entered within the household boundaries is now in one of said set of household possessions. In this connection, there may be means associated with vendors of household products containing RFID tags newly sold to said householder for inputting data indicating that the newly sold product is in the set of household products. In such a procedure, the product purchased by the vendor is automatically tracked without too much additional input effort on the part of the purchaser. The tracked and managed data may conveniently be household product warranty and servicing data. Such data may be secured through World Wide Web (Web) communication means through which the data may be input.

According to another aspect of the invention, there is provided means enabling said householder to designate household possessions in the set for which the householder is alerted if the RFID tags in these designated possessions are not within said RF limited household boundaries. The householder is enabled to override alerts and prompts.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
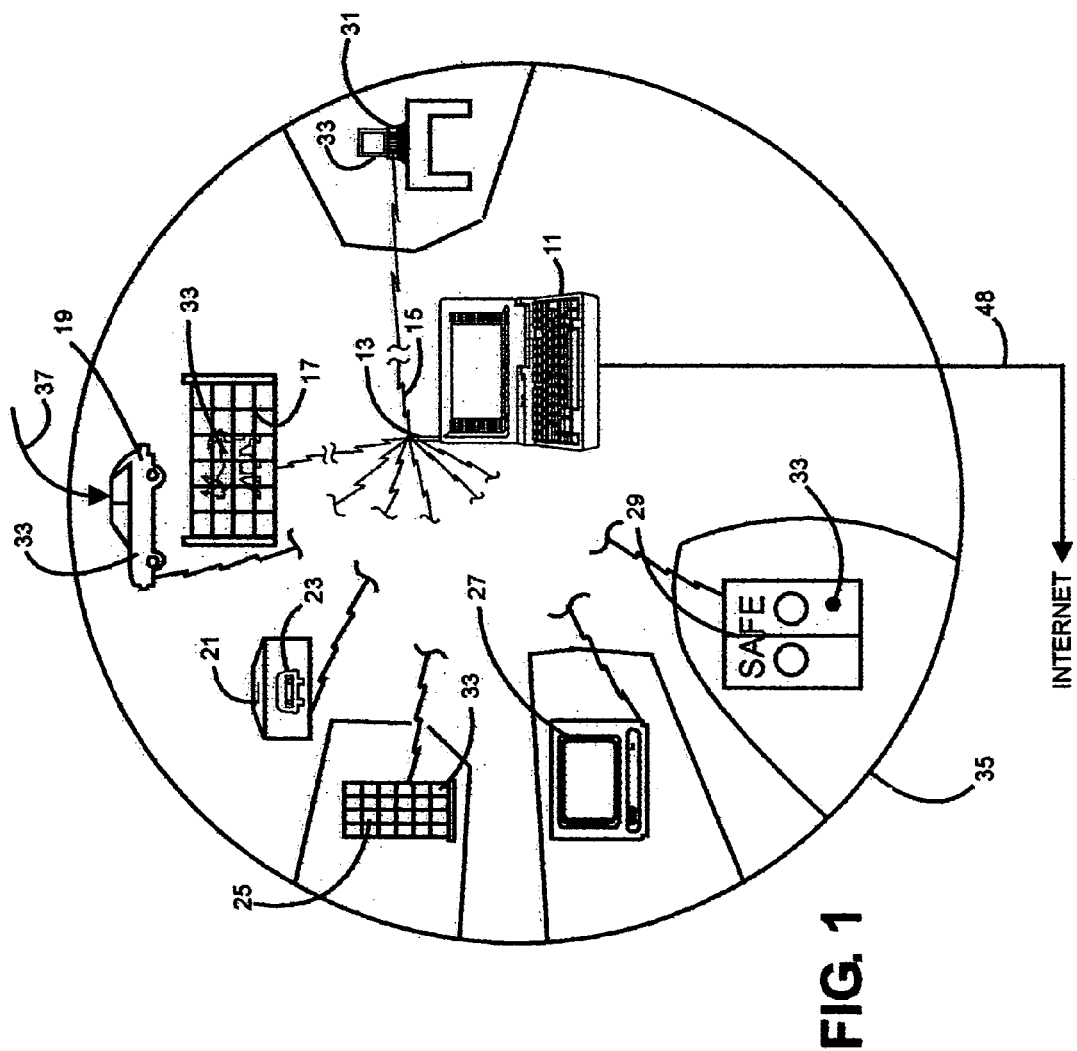
FIG. 1 is a generalized diagrammatic view of a household RFID system with some illustrative household possessions to show the combination of the elements of the present invention.

Referring to FIG. 1, there is provided a generalized view of a RFID system set up for a household in accordance with the present invention. The household facility is limited and defined by boundary 35, which in an illustrative normal household may be in the order of a 200 ft. radius from a centrally located RFID control center 11 that, as will be hereinafter described in greater detail, is a display computer controlled transceiver sending and receiving signals 15 via antenna 13 from a set of RFID tags shown as black dots 33 in the plurality of household possessions within boundary 35 being monitored. Such typical possessions include safe 29, television set 27, books in library 25, automobile 23 in garage 21, as well as a dog 17 in a kennel and a computer 31 in a home office.

Because, as set forth above, RFID system technology is an old and well established technology, the technology implementation is well known, and it is beyond the scope of the present invention to detail known RFID technology. The present invention does not involve any technological innovations in RFID but rather an application of RFID tag technology for household possession tracking and control functions.

Thus, central transceiver control center 11 may wirelessly communicate with the RFID tags 33 in the set of household products being monitored and controlled. The RFID tags may be a combination of passive and active RFID tags dependent on the value of the tagged possession and its usual distance from the controlling transceiver. Where the spacing is small enough, passive devices alone are possible. Often, a combination of active and passive RFID tags are used. In such a situation, a RFID control transceiver must be selected that operates at frequencies within the ranges of both active and passive tags.

In an alternate arrangement to that diagrammatically shown, if it is desired to set up a system of primarily passive RFID tags in the possessions that have a short range sensing distance in the order of up to 10 feet, then the RF sensors, i.e. the transceivers, would have to be spaced in the house at relatively narrow intervals, e.g. in each room, workshop, office or garage in the household. These would sense and communicate with the passive tags in the possessions and transmit by appropriate wired connections to the control unit 11.

A wireless LAN network could also perform this function of interconnecting the RF sensors that sense the tags by sending and receiving wireless RF signals from the tags through their respective antennae wirelessly communicate with a corresponding (IEEE 802.11B protocol) wireless hub having an associated network server that could function as RFID controller 11. The LAN server in RFID controller 11 may communicate with the Internet, for example through appropriate communication linkage 48.

Figure 2:
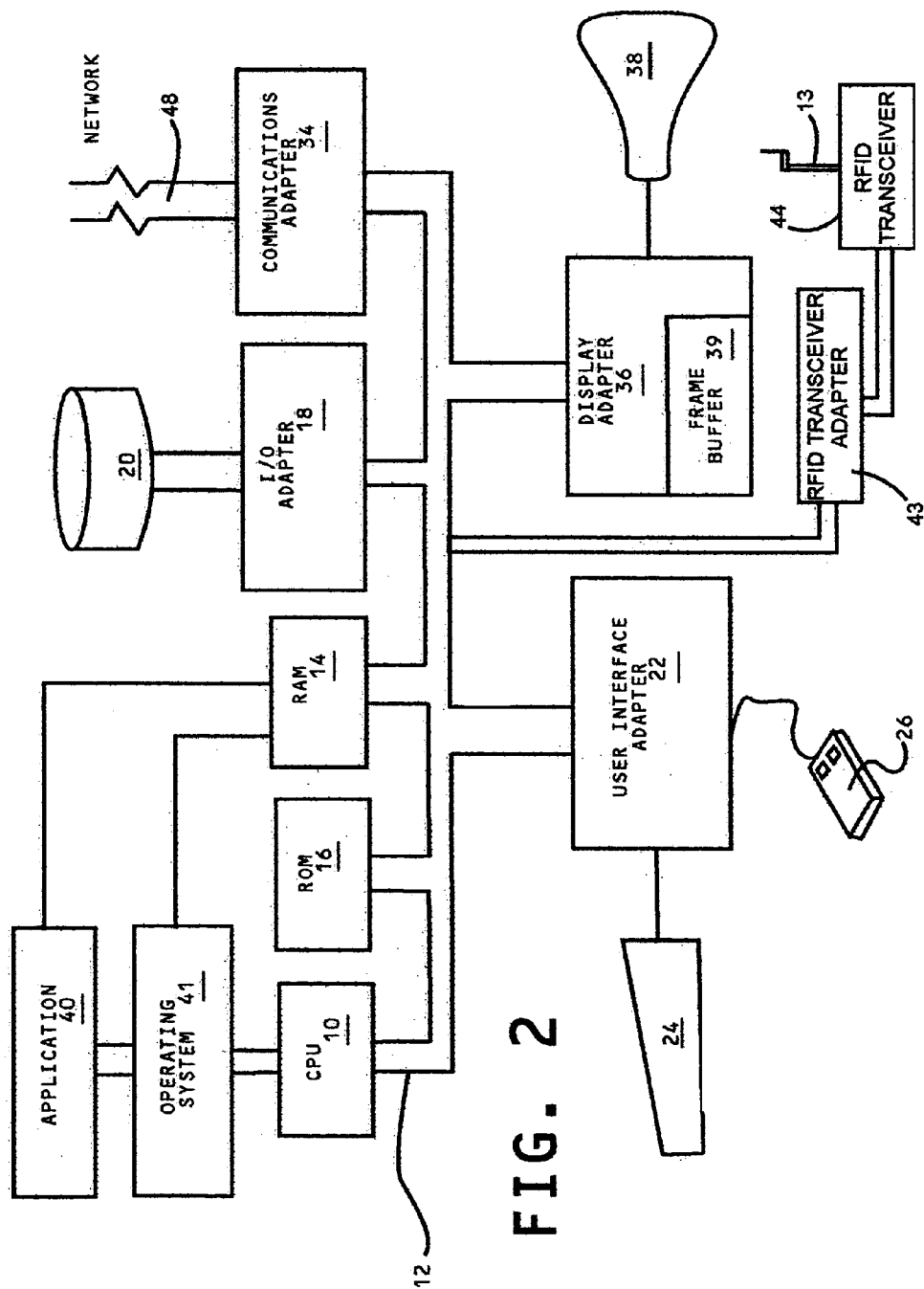
FIG. 2 is a block diagram of a data processing system including a central processing unit and network connections via a communications adapter that is capable of functioning as the controlling display computer of the present invention.

Referring now to FIG. 2, a typical generalized data processing system display terminal is shown that may function as the computer and/or server in RFID controller 11 the wireless of this invention. A central processing unit (CPU) 10, such as any PC microprocessor in a PC available from International Business Machines Corporation (IBM) or Dell Corp., is provided and interconnected to various other components by system bus 12. An operating system 41 runs on CPU 10, provides control and is used to coordinate the functions of the various components of FIG. 1. Operating system 41 may be one of the commercially available operating systems, such as Microsoft's Windows Millennium™ or WindowsNT™, as well as the UNIX or IBM AIX operating systems. An application program that includes routines of the present invention for controlling and tracking of RFID tagged household possessions to be subsequently described in detail, runs in conjunction with operating system 41 and provides output calls to the operating system 41, which, in turn, implements the various functions to be performed by the application 40. A Read Only Memory (ROM) 16 is connected to CPU 10 via bus 12 and includes the Basic Input/Output System (BIOS) that controls the basic computer functions. Random Access Memory (RAM) 14, I/O adapter 18 and communications adapter 34 are also interconnected to system bus 12. It should be noted that software components, including operating system 41 and application 40, are loaded into RAM 14, which is the computer system's main memory. I/O adapter 18 may be a Small Computer System Interface (SCSI) adapter that communicates with the disk storage device 20, i.e. a hard drive. Communications adapter 34 interconnects bus 12 with an outside network linkage 34 to communicate with other such systems over a network includes, of course, the Internet or Web. I/O devices are also connected to system bus 12 via user interface adapter 22 and display adapter 36. Keyboard 24 and mouse 26 are all interconnected to bus 12 through user interface adapter 22. Mouse 26 operates in a conventional manner insofar as user movement is concerned. There is a display associated with the controlling computer or server. In such a set up, display adapter 36 includes a frame buffer 39 that is a storage device that holds a representation of each pixel on the display screen 38. Images may be stored in frame buffer 39 for display on monitor 38 through various components, such as a digital to analog converter (not shown) and the like. By using the mouse or related devices, a user is capable of inputting information to the system through the keyboard 24 or mouse 26 and receiving output information from the system via display 38. The central RFID transceiver 44 communicates with RFID tags via antenna 13 and is connected into the system bus 12 via RFID transceiver adapter 43.

Figure 3:
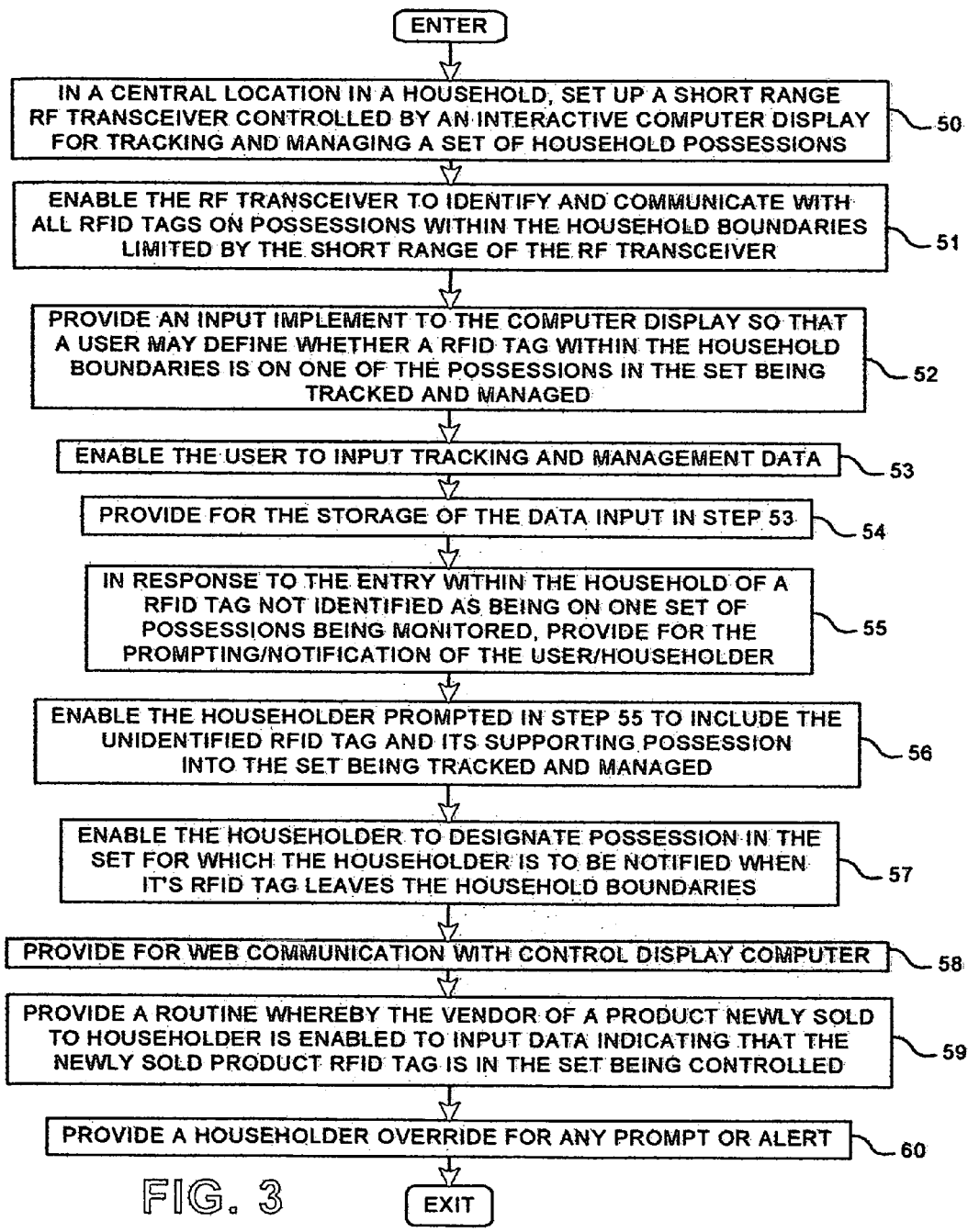
FIG. 3 is an illustrative flowchart describing the setting up of the elements of a program according to the present invention for tracking and controlling household products through a RFID tag system.

Now, with reference to the programming shown in FIG. 3 there will be described how the system and programs of the present invention are set up. The invention involves an interactive display computer controlled RFID household system enabling a householder to manage and track household possessions contained within the household boundary defined by the RF transceiver set up. However, beyond merely tracking the possessions against loss and theft, the invention offers the user/householder a system where virtually all important aspects of a product may be entered, tracked and stored with minimal effort on the part of the user/householder. Everyone who has acquired household possessions readily comes to recognize that possession ownership requires considerable time and effort to avoid loss and other uncompensated reduction in value due to the failure of the user to track and take maximum advantage of financial, administrative and technical processes associated with the ownership of these possessions. Among these processes are warranties and the expiration thereof, insurance, product recalls, product servicing schedules, product rebates and other financial incentives.

Conventionally, the user has had to keep mental track of these situations and remain alert to a variety of announcements or has had to keep bills and like statements and periodically scan through these to find dates and product IDs. Alternatively, where computer systems and programs have been available to assist the user in such tracking, the user acquiring a new possession has had to devote considerable time to the entry of appropriate data so that the system could track significant future data related to the product.

The systems and programs according to this invention relieve the householder/user of most of such burdens by providing a process for initial data entry with minimal user interactive effort. In addition, the system and programs also relieve the user of most of the effort in the subsequent tracking of the administrative, financial and technical advantages of owning the possessions. These advantages will be better understood with respect to the programming described in FIG. 3.

Within a household, at a central location, there is set up a short range RF transceiver controlled through an interactive computer display for tracking and managing a set of household possessions, step 50. This RF transceiver is enabled to distinctly identify and communicate with all RFID tags on possessions within the household boundaries that are limited by the short ranges of the RF transmitter systems for identifying RFID tags, step 51. An I/O implementation through the computer display is provided whereby a user may define whether a RFID tag sensed to be within the household boundaries being tracked on a possession being tracked and managed, step 52. In the case where the possession is being tracked and managed, the user is enabled/prompted to input tracking and management data, step 53, and such data is stored, step 54. For example, the user may be prompted with the following interactive display screen:

---
STEREO SPEAKER WARRANTY EXPIRES 09/19/04.
ANY REMAINING CLAIMS?:  Y___  N___
EXTEND WARRANTY?  Y___  N___
---

When a RFID tag enters the household facility that is not identified as being on one of the possessions being monitored (e.g. FIG. 1, an automobile 19 enters within household boundary 35 along entry path 37), then step 55, FIG. 3, the householder is prompted in the following display screen:

---
UNIDENTIFIED AUTO TAG ALERT
ENTER INTO SET?  Y___  N___
OTHER ACTION?  Y___  N___
---

The user is, thus, enabled to include the unidentified RFID tag and its associated possession into the household set being tracked and managed, step 56.

The user is also enabled to designate any possession in the set for which the user is to be notified if its associated RFID tag leaves the household boundary, step 57.

A Web or Internet connection for communication is maintained so that any administrative information may be automatically entered into the stored data for product tracking and managing upon a request from the product or possession that identifies the product, step 58, e.g. warranty or recall information. Along similar lines, the vendor and/or the manufacturer of a product newly sold to the householder may either provide the purchaser with a disk to be loaded into the computer or with an Internet access code that will download all known warranty and service information, step 59. Finally, the householder is provided with an override for any prompt or alert presented, step 60.

Figure 4:
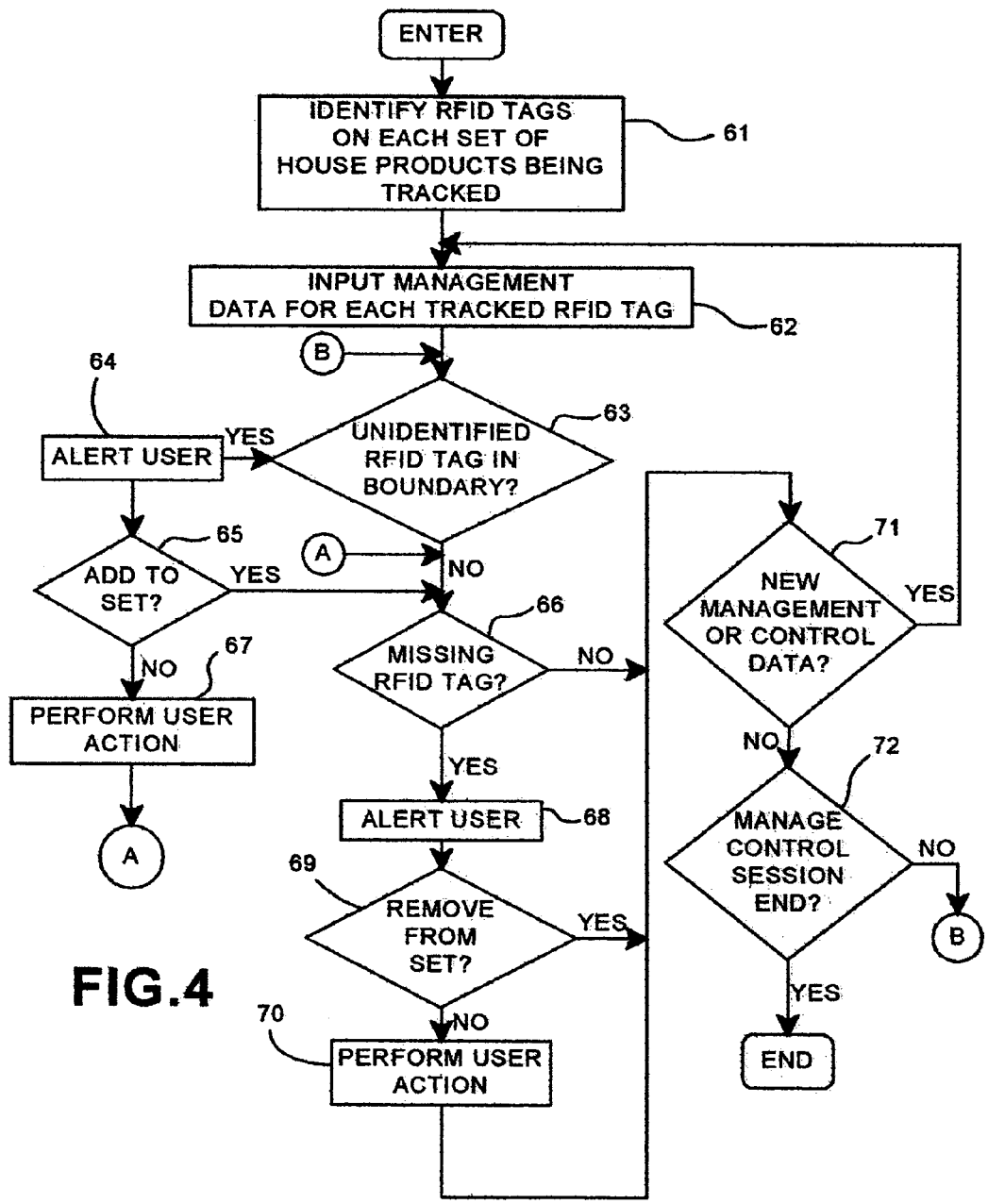
FIG. 4 is a flowchart of an illustrative run of the program set up in FIG. 3.

Now, with reference to the flowchart of FIG. 4, a simplified illustrative run of the process set up in FIG. 3 will be described. The simplification is made so as to illustrate an understandable process. Initially in the managing and tracking system, the RFID on each product in the set of products being tracked is uniquely identified, step 61. Appropriate management and tracking data for each product RFID tag has been input, step 62. A determination is made as to whether an unidentified RFID tag has been sensed to be within the household boundary, step 63. If Yes, the user is alerted, step 64, and a determination is made, step 65, as to whether the user has selected to add the RFID tag and its associated product to the set being tracked. If Yes, the tag and its associated product are added to the set being tracked. If No, then the user is permitted to perform any other appropriate selected action, step 67, and the process is returned to step 66 via branch "A". Likewise, a Yes decision in step 65 or a No decision in step 63 moves the process to step 66 where a determination is made as to whether an RFID tag and, consequently, its associated product is missing from within the household boundaries. If Yes, the user is alerted, step 68, and a determination is made, step 69, as to whether the user has selected to remove the RFID tag and its associated product from the set being tracked. If Yes, the tag and its associated products are removed from the set being tracked. If No, then the user is permitted to perform any other appropriate selected action, step 70, and the process is moved to step 71. Likewise, a Yes decision in step 69 or a No decision in step 66 moves the process to step 71 where a determination is made as to whether there is new management and/or control data to be entered. If Yes, the process is returned to step 62 where such data is input into the process. If No, the process proceeds to step 72 where a determination is made as to whether the management/control session is at an end. If Yes, the session is exited. If No, the process is returned to step 63 via branch "B".

One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. A computer controlled interactive display REID (radio frequency identification) household system enabling a householder to track and manage a set of RFID tags containing household possessions located within short range RF limited boundaries of a household facility comprising:

a short range RF transceiver for identifying and communicating with all RFID tags within said household boundaries;

means for inputting data indicating whether a RFID tag within said household boundaries is in one of said set of household possessions;

means for inputting said tracking and management data;

means for storing said input data;

means for prompting said householder in response to the entry within said household boundaries of a RFID tag not in one of said set of household possessions; and means responsive to said prompting means for enabling said householder to input said data indicating that said RFID tag entered within said household boundaries is now in one of said set of household possessions.

2. The computer controlled display RFID household system of claim 1 further including:

means enabling said householder to designate household possessions in said set for which said householder is alerted if the RFID tags in said designated possession are not within said RF limited household boundaries.

3. The computer controlled display RFID household system of claim 2 further including means enabling said householder to selectively override any of said prompts.

4. The computer controlled display RFID household system of claim 1 further including Web communication means through which said tracking and management data may be input.

5. The computer controlled display RFID household system of claim 4 further including means associated with vendors of household products containing RFID tags newly sold to said householder for inputting data indicating that said newly sold product is in said set of household products.

6. The computer controlled display RFID household system of claim 4 wherein said tracked and managed data includes household product warranty and servicing data.

7. A computer controlled interactive display RFID method enabling a householder to track and manage a set of RFID tags containing household possessions located within short range RF limited boundaries of a household facility comprising:
- identifying and communicating with all transponders within said household boundaries;
- inputting data indicating whether a RFID tag within said household boundaries is in one of said set of household possessions;
- inputting said tracking and management data;
- storing said input data;
- prompting said householder in response to the entry within said household boundaries of a RFID tag not in one of said set of household possessions; and
- enabling said householder in response to said prompting to input said data indicating that said RFID tag entered within said household boundaries is now in one of said set of household possessions.

8. The RFID household method of claim 7 further including the step of enabling said householder to designate household possessions in said set for which said householder is alerted if the RFID tags in said designated possession are not within said RF limited household boundaries.

9. The RFID household method of claim 8 further including the step of enabling said householder to selectively override any of said prompts.

10. The RFID household method of claim 7 wherein said tracking and management data is input over the Web.

11. The RFID household method of claim 10 further including the step of enabling vendors of household products containing RFID tags newly sold to said householder for inputting data indicating that said newly sold product is in said set of household products.

12. The RFID household method of claim 10 wherein said tracked and managed data includes household product warranty and servicing data.

13. A computer program having code recorded on a computer readable medium for enabling a householder to track and manage a set of RFID tags containing household possessions located within short range RF limited boundaries of a display computer controlled RFID household facility comprising:
- a short range RF transceiver for identifying and communicating with all transponders within said household boundaries;
- means for inputting data indicating whether a RFID tag within said household boundaries is in one of said set of household possessions;
- means for inputting said tracking and management data;
- means for storing said input data;
- means for prompting said householder in response to the entry within said household boundaries of a RFID tag not in one of said set of household possessions; and
- means responsive to said prompting means for enabling said householder to input said data indicating that said RFID tags entered within said household boundaries is now in one of said set of household possessions.

14. The computer program of claim 13 further including:
means enabling said householder to designate household possessions in said set for which said householder is alerted if the RFID tags in said designated possession are not within said RF limited household boundaries.

15. The computer program of claim 14 further including means enabling said householder to selectively override any of said prompts.

16. The computer program of claim 13 further including Web communication means through which said tracking and management data may be input.

17. The computer program of claim 16 further including means associated with vendors of household products containing RFID tags newly sold to said householder for inputting data indicating that said newly sold product is in said set of household products.

18. The computer program of claim 16 wherein said tracked and managed data includes household product warranty and servicing data.

* * * * *